(No Model.) 5 Sheets—Sheet 1.

G. KRUEGER.
REGISTERING LUMBER MEASURE.

No. 541,763. Patented June 25, 1895.

WITNESSES:

INVENTOR
G. Krueger
BY
Munn & Co
ATTORNEYS (No Model.) 5 Sheets—Sheet 3.

G. KRUEGER.
REGISTERING LUMBER MEASURE.

No. 541,763. Patented June 25, 1895.

WITNESSES:

INVENTOR
G. Krueger
BY
Munn & Co.
ATTORNEYS (No Model.) 5 Sheets—Sheet 4.
G. KRUEGER.
REGISTERING LUMBER MEASURE.

No. 541,763. Patented June 25, 1895.

(No Model.)  
5 Sheets—Sheet 5.
G. KRUEGER.
REGISTERING LUMBER MEASURE.
No. 541,763. Patented June 25, 1895.
Fig. 7.
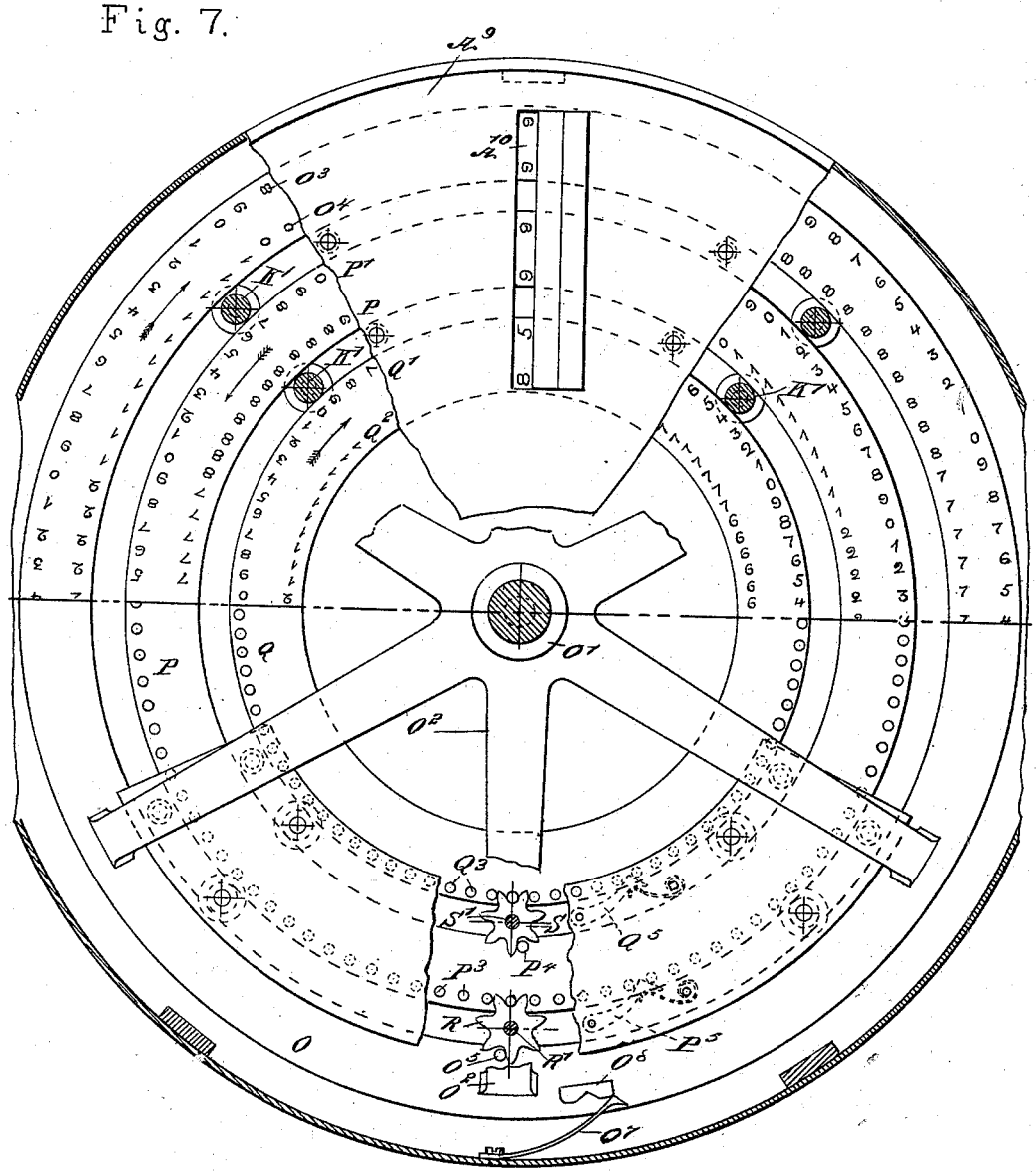
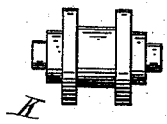
Fig. 8.
WITNESSES:
INVENTOR
BY
ATTORNEYS

UNITED STATES PATENT OFFICE.

GEORGE KRUEGER, OF JOHNSTOWN, PENNSYLVANIA.

REGISTERING LUMBER-MEASURE.

SPECIFICATION forming part of Letters Patent No. 541,762, dated June 25, 1895.

Application filed November 21, 1894. Serial No. 529,438. (No model.)

*To all whom it may concern:*

Be it known that I, GEORGE KRUEGER, of Johnstown, in the county of Cambria and State of Pennsylvania, have invented a new and Improved Measuring and Registering Device, of which the following is a full, clear, and exact description.

The invention relates to measuring and registering devices such as shown and described in the application for Letters Patent of the United States, Serial No. 509,391, filed by me under date of April 28, 1894, and allowed September 19, 1894.

The object of the present invention is to provide a new and improved measuring and registering device designed for measuring lumber and other articles, and which is comparatively simple and durable in construction, not liable to get out of order, arranged to permit of measuring large amounts and to easily read the same, and to permit of conveniently and rapidly re-setting the device at zero.

The invention consists principally of a rotatable shaft, a series of graduated gear wheels mounted thereon, registering devices having gear wheels loosely mounted on their supporting shafts and held in mesh with the said graduated gear wheels, a clutch mechanism for each registering device, to lock the gear wheel to its shaft, and a shifting device under the control of the operator and connected with the said clutch mechanism to actuate the same and positively connect the gear wheel of the corresponding registering device to its supporting shaft.

The invention also consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1:
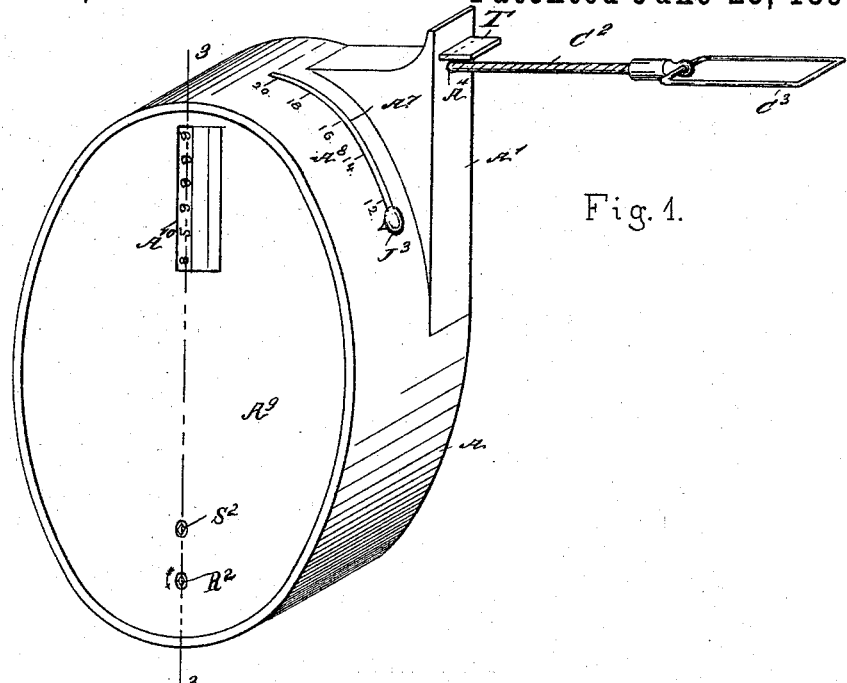
Figure 2:
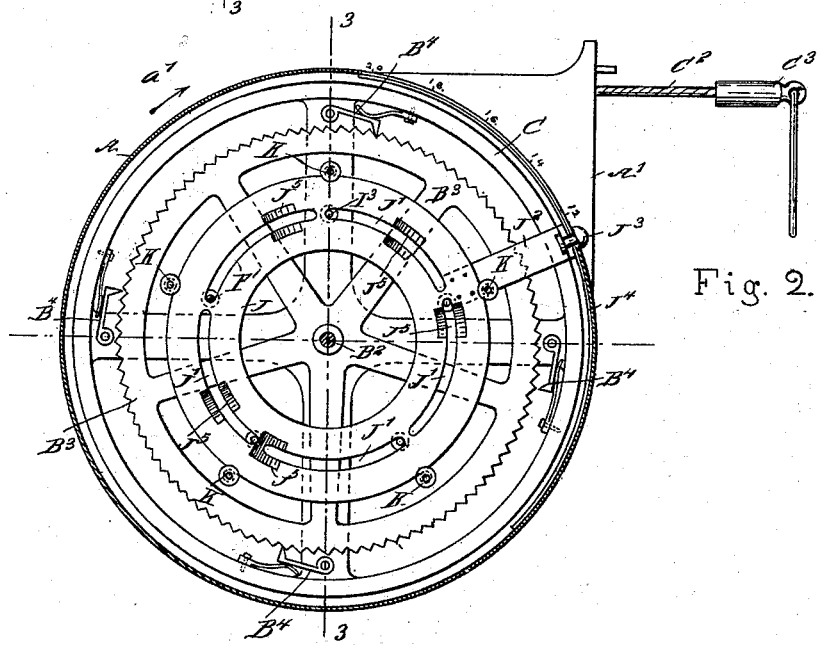
Figure 3:
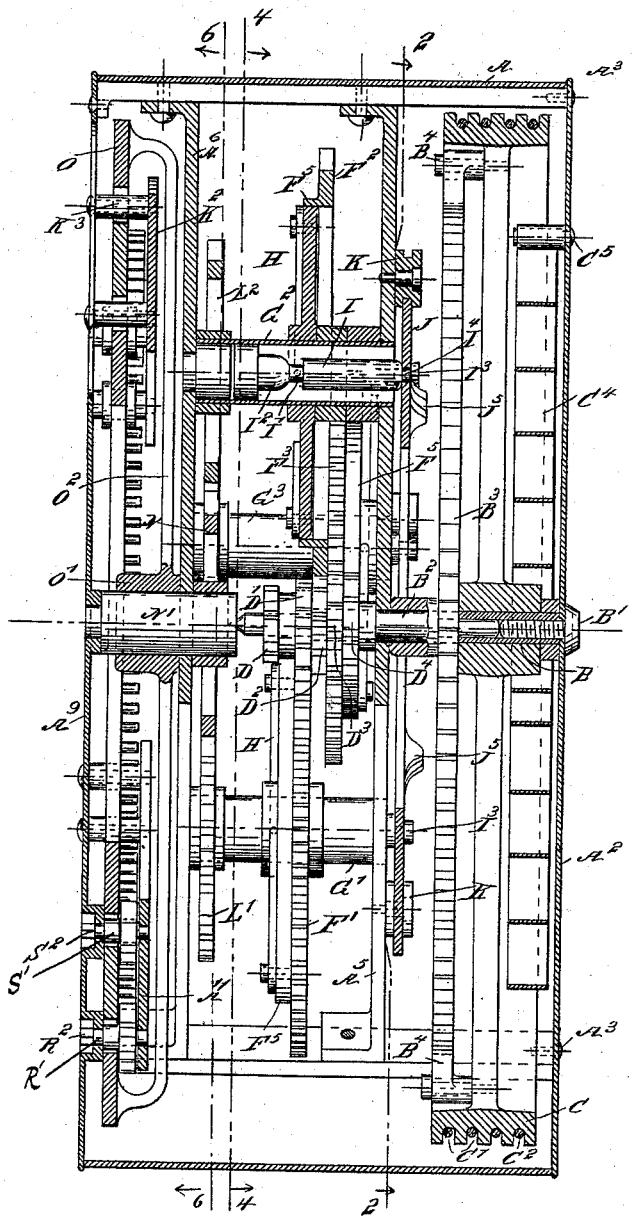
Figure 4:
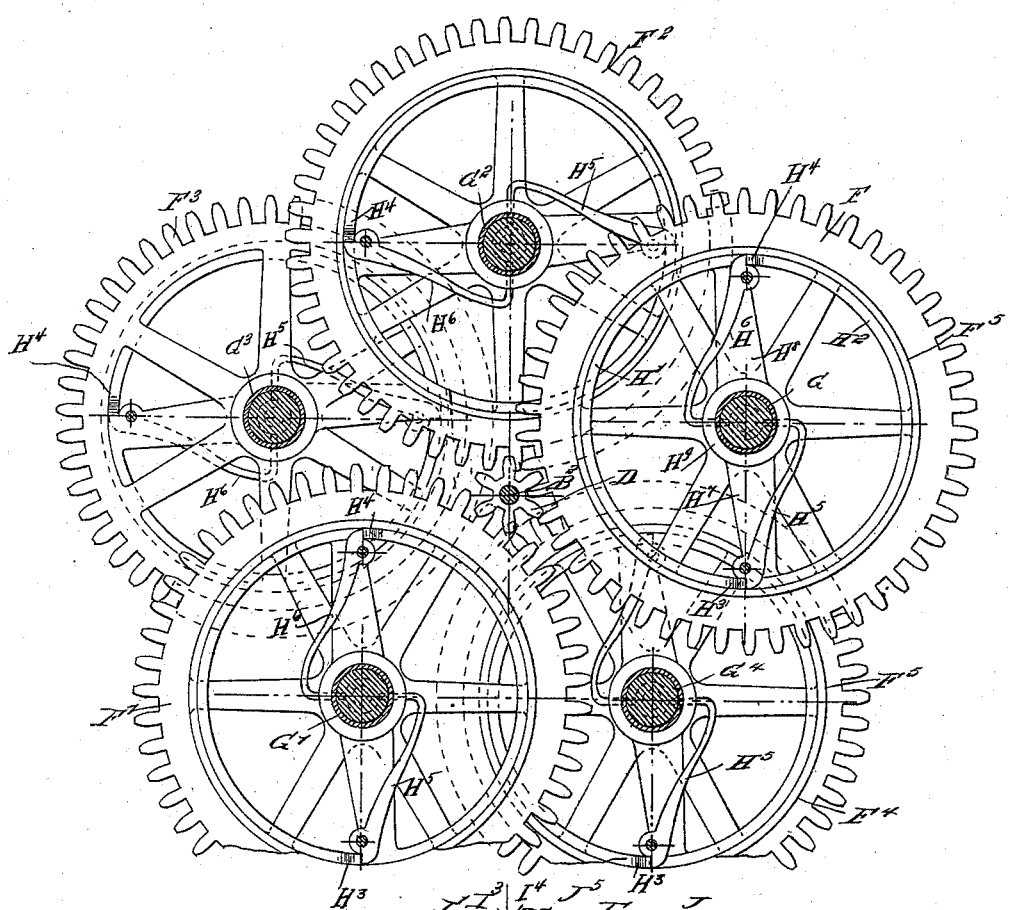
Figure 5:
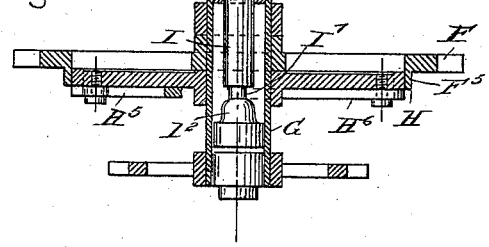
Figure 6:
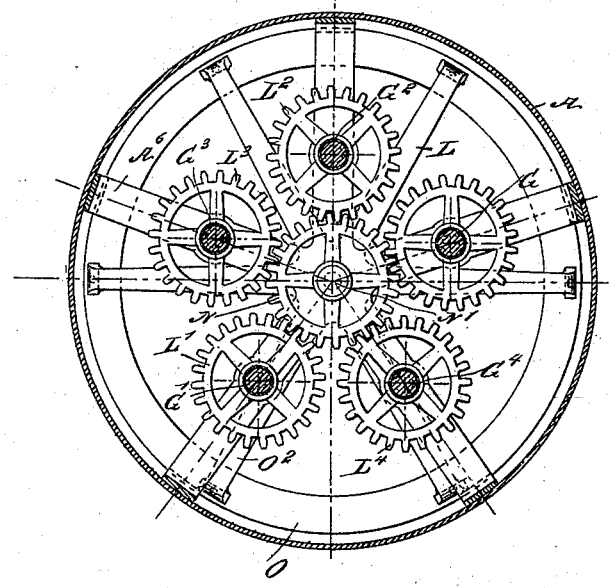

Figure 1 is a perspective view of the improvement. Fig. 2 is a sectional front elevation of the same on the line 2 2 of Fig. 3. Fig. 3 is an enlarged transverse section of the same on the line 3 3 of Figs. 1 and 2. Fig. 4 is a sectional front elevation of the same on the line 4 4 of Fig. 3. Fig. 5 is a sectional plan view of part of a registering device and the clutch mechanism therefor. Fig. 6 is a reduced rear side elevation of the improvement on the line 6 6 of Fig. 3. Fig. 7 is a rear front elevation of the improvement, with parts broken out and parts in section; and Fig. 8 is a side elevation of one of the anti-friction rollers for the registering device.

The improved measuring and registering device is provided with a suitably constructed casing A, preferably made of sheet metal, and formed with the straight end $A'$ adapted to abut against one edge of the lumber or other article to be measured, so as to hold the casing stationary on the article while the measure is taken. The casing A is provided with a back $A^2$, secured in position by screws $A^3$, and the said back carries at or near its center, a screw $B'$, engaging and holding a stud B on which is mounted to rotate loosely, a wheel C provided in its periphery with a helical groove $C'$ engaged by a measuring cable, cord, rope, band or chain $C^2$, made of suitable material and fastened at one end to the wheel C, at the periphery thereof.

The outer end of the cable $C^2$ is adapted to pass through an opening $A^4$ formed in the straight end $A'$ of the casing A, and on the outer end of the cable is arranged a suitable handle $C^3$ adapted to be taken hold of by the operator, to pull the cable out of the casing and over the surface to be measured as hereinafter more fully described.

The wheel C is controlled by a spring $C^4$ connected at its inner end with the hub for the wheel C, and at its outer end with a stud $C^5$ secured to the back $A^2$ of the casing, so that the tension of the said spring $C^4$ can be increased or diminished by turning the back $A^2$ after the screws $A^3$ have been removed. When the cable $C^2$ is pulled outward, it unwinds from the wheel C, and rotates the latter in the direction of the arrow $a'$ so as to wind up the spring $C^4$, and when the operator releases the handle $C^3$, then the previously compressed spring $C^4$ causes the return movement of the wheel C to again wind up the cable $C^2$ on the wheel.

A second shaft $B^2$ has one end journaled in a partition $A^5$ arranged in the casing A, its rear end being reduced and mounted to turn in the hollow stud B, as plainly shown in Fig. 3. On this shaft $B^2$ is secured a ratchet wheel B³ engaged by a series of spring or other pawls B⁴ fulcrumed on the front face of the wheel C, as plainly illustrated in Figs. 2 and 3. The ratchet wheel B³ and the pawls B⁴ are arranged in such a manner that when the wheel C is turned in the direction of the arrow a', on pulling the cable C² outward as previously explained, then the said pawls B⁴ carry the ratchet wheel B³ along to rotate the shaft B² in the same direction. When the cable C² is again wound up on its wheel C as previously described, by the operator releasing the pull on the handle C³, then the wheel C travels in the inverse direction of the arrow a', and the pawls B⁴ glide over the teeth of the ratchet wheel B³ without turning the latter.

On the forward end of the shaft B² are secured a series of graduated gear wheels D, D', D², D³ and D⁴, having a different number of teeth, as plainly indicated in Fig. 3, the said wheels each controlling a registering device presently to be described in detail. The gear wheels D, D', D², D³ and D⁴ mesh into the spur wheels F, F', F², F³ and F⁴ respectively, mounted to rotate loosely on hollow shafts G, G', G², G³ and G⁴ respectively, journaled in the partitions A⁵ and A⁶ secured in the casing A.

On each shaft G, G', G², G³ and G⁴ is arranged a clutch mechanism H, seen in Figs. 3, 4 and 5 for connecting the corresponding spur wheel F, F', F², F³ and F⁴ with its shaft for a purpose hereinafter more fully described. This clutch mechanism H for each spur wheel is provided with two semi-circular clutch rings H' and H², adapted to engage the inner face of a ring F⁵ projecting from each spur wheel F, F', F², F³ and F⁴. Each segmental ring H' and H² is formed with a lug or projection H³ and H⁴ respectively, adapted to be engaged by a lever H⁵ and H⁶ respectively, fulcrumed on the diametrically arranged arms H⁷ and H⁸ respectively, carrying the rings H' H² and held on a hub H⁹ secured to the shaft G. One end of the clutch ring H' is secured to the arm H⁸ while the free end of the said ring is provided with the projection H³ acted on by the lever H⁵ fulcrumed on the other arm H⁷. The ring H² is similarly arranged, that is, one end is secured on the arm H⁷ and its free end is provided with the projection H⁴, pressed on by the lever H⁶ fulcrumed on the arm H⁸. When the levers H⁵ and H⁶ are actuated they press the lugs H³ and H⁴ and move the segmental rings in frictional contact with their ring F⁵. The inner ends of the levers H⁵ and H⁶ are bent and extend through openings into the hollow shaft G, G', G², G³, or G⁴, the inner ends of the said levers extending into an annular recess I' formed in a pin I, having a transverse sliding motion within the hollow shaft G, G', G², G³ or G⁴, and on the said pin I is formed a boss I², adapted to press on the inner ends of the levers H⁵ and H⁶, and cause the levers to swing outward and to press with their outer ends the lugs H³ and H⁴. Normally the inner ends of the levers H⁵ and H⁶ extend into the recess I' of the shaft, so that the segmental rings are held out of frictional contact with the corresponding ring F⁵, to permit the spur wheel F, F', F², F³ or F⁴ to rotate loosely on its shaft G, G', G², G³ or G⁴. When the pin I, however, is moved longitudinally, then the boss I², in forcing the levers apart, causes the segmental rings to move in frictional contact with the corresponding ring F⁵, so that the corresponding spur wheel is locked to its shaft, and consequently when the spur wheel is rotated it rotates the shaft on which it is mounted. Now the several pins I, in the hollow shafts G, G', G², G³ and G⁴ are under the control of the operator so as to move any desired clutch mechanism in engagement with its wheel, to lock the latter to its shaft. For this purpose the rear end of each pin I is formed with the reduced end I³ extending into a segmental slot J' formed in a ring J mounted to turn in anti-friction rollers K, journaled on studs attached to the partition A⁵. The reduced end I³ terminates in a button or head I⁴, which engages the back of the ring J. The latter is provided with a handle J², extending to the rim of the casing A, and carrying at its outer end a pointer J³ passing through a segmental slot A⁷ in the rim of the casing, the said pointer being adapted to be taken hold of by the operator to move the handle J² so as to shift the position of the ring J, it being understood that the latter turns in its anti-friction rollers K arranged in a circle, as illustrated in Fig. 2. A graduation A⁸ is arranged on the casing A alongside the slot A⁷, so that the operator is enabled to readily move the pointer to a desired mark on the graduation to correspond with the lumber to be measured.

On the back of the ring J are formed projections J⁵ in the path of the head I⁴ for each pin I; the said projections being arranged relative to the marks on the graduations A⁸, so that when the operator moves the ring J, one of the heads I⁴ is engaged by the corresponding projections J⁵, to pull the pin I rearwardly to actuate the corresponding clutch mechanism and connect the desired spur wheel F, F', F², F³, F⁴ with its shaft G, G', G², G³ or G⁴.

As illustrated in the drawings, the gear wheels D, D', D², D³ and D⁴ have twelve, fourteen, sixteen, eighteen and twenty teeth respectively, and corresponding numerals are marked on the graduation A⁸, so as to indicate that lumber of twelve, fourteen, sixteen, eighteen or twenty feet long can be measured by the device in question. The wheel C and cable C² are so constructed, that when the cable C² has been drawn over a board twelve inches wide, then the wheel C has made one full revolution and consequently a full revolution is made by each of the gear wheels D, D', D², D³ or D⁴. The spur wheels F, F', F², F³ and F⁴ have each one hundred teeth, and consequently when each of the said wheels has made one full revolution, then one hundred feet of board measure will be indicated.

For illustration: A board twelve inches wide is considered as a unit of one hundred, and if twelve feet long it contains twelve square feet; if fourteen feet long, fourteen square feet, and so on. Now as the cable $C^2$ produces one full revolution of the wheel C when pulled over a board twelve inches wide, then the transmitting wheels D, D', $D^2$, $D^3$ and $D^4$, owing to the number of teeth previously mentioned, cause the wheels F, F', $F^2$, $F^3$ and $F^4$ to move correspondingly so as to indicate .12 .14 .16 .18 and .20 of a revolution to each full revolution of the wheels D, D', $D^2$, $D^3$ and $D^4$, and consequently every full revolution of the wheels F, F', $F^2$, $F^3$ and $F^4$, is equal to one hundred feet measured with the cable $C^2$ on lengths of boards corresponding to twelve, fourteen, sixteen, eighteen and twenty feet respectively.

It is understood that the apparatus may be arranged for measuring other lengths of boards in a like manner, but the ones given are the principal ones for practical purposes, and I have confined the apparatus to these.

As the above mentioned figures can be divided by two, I prefer to use fifty cogs in the wheels F, F', $F^2$, $F^3$ and $F^4$, and on the wheels D, D', $D^2$, $D^3$ and $D^4$, six, seven, eight, nine and ten teeth respectively, with the same results as given above. See Fig. 4.

It will be seen that when the operator moves the pointer $J^3$, say to the numeral 12 on the graduation $A^8$, then the gear wheel F is locked to its shaft G, and consequently the motion of the gear wheel D is transmitted by the gear wheel F to the shaft G, it being understood that the device is set for measuring boards of twelve feeth in length. The other gear wheels F', $F^2$, $F^3$ and $F^4$ likewise rotate, but as they are not locked to their shafts G', $G^2$, $G^3$ and $G^4$, the said shafts are not turned directly by the said gear wheels but are indirectly rotated by the wheels N, L', $L^2$, $L^3$ and $L^4$, hereinafter described.

In order to register the lumber measured, I provide the following device: On the forward ends of the shafts G, G', $G^2$, $G^3$ and $G^4$ are secured the gear wheels L, L', $L^2$, $L^3$ and $L^4$ respectively meshing into a central gear wheel N, secured on a shaft N' mounted to turn in suitable bearings arranged in the partition $A^6$, and the front face $A^9$ of the casing. See Fig. 3. On this shaft N' is secured a hub O', provided with spokes $O^2$, bent forwardly at their outer ends to support a ring O formed on its face with two sets of numerals $O^3$ and $O^4$, as plainly illustrated in Fig. 7, the numerals being adapted to be seen in pairs in a slot $A^{10}$ arranged radially in the front $A^9$ of the casing. Within the ring O and concentric thereto, is arranged a second ring P, likewise provided on its front face with two sets of numerals P' and $P^2$, and within this ring P is arranged a third concentric ring Q also having two sets of numerals Q' and $Q^2$. The rings P and Q are mounted to turn in anti-friction rollers K' similar to the friction rollers K previously mentioned, and these friction rollers K' are journaled at their forward ends in the front $A^9$ of the casing, and at their rear ends in bearings $K^2$ supported by studs $K^3$ from the front $A^9$, the said studs passing through the slots between the rings O, P and P, Q, as plainly indicated in Fig. 7. See also Fig. 3. On the back of the ring O is secured a tooth $O^5$, adapted to engage a pinion R, secured on a transversely extending shaft R', mounted to turn in suitable bearings arranged in the front $A^9$ of the casing, and in a bearing $A^{11}$ supported from the front of the casing by studs similar to the bearings $K^2$. This gear wheel R is in mesh with the teeth $P^3$ formed on the back of the ring P, and on the latter is secured a tooth $P^4$, in mesh with a pinion S secured on a shaft S' journaled in a similar manner as the shaft R'. This pinion S is in mesh with teeth $Q^3$ on the back of the ring Q, and the forward ends of the shafts R' and S' are preferably made square, as at $R^2$ and $S^2$ respectively, to permit the operator to apply a suitable key to either shaft, to rotate the same and their pinions R and S for rapidly and conveniently resetting the device at zero as hereinafter more fully described. In order to hold the ring O at the zero point, I provide a spring $O^7$ secured to the casing and engaging with its free end a notched lug $O^8$ held on the ring O, to prevent accidental shifting or turning of the ring O. A spring-pressed pawl $P^5$ is held on the plate $K^2$, to engage the teeth $P^3$, to prevent accidental turning of the ring P, and a similar spring-pressed pawl $Q^5$ engages the teeth $Q^3$, to obtain the same result on the ring Q. As the gear wheels L, L', $L^2$, $L^3$, $L^4$ and N are all alike in size, the ring O will be given a complete revolution whenever a complete revolution of the shaft G, G', $G^2$, $G^3$, or $G^4$ is made. The face of the ring O is divided into one hundred equal parts which are numbered starting with two zeros 0 0 up to 99. The other rings P and Q are similarly provided with their numerals P', $P^2$ and Q', $Q^2$ arranged in the same way, it being understood that the numerals $O^3$ as they appear in the slot $A^{10}$ indicate units, the numerals $O^4$ indicate tens, the numerals P' hundreds, the numerals $P^2$ thousands, the numerals Q' ten thousands and the numerals $Q^2$ one hundred thousands. For instance; when the device has been used to measure boards as indicated in Fig. 7, the reading 859,999 indicates that that amount of lumber in square feet has been measured. When the ring O has made one revolution, that is, has moved from 99 to zero, as seen through slot $A^{10}$, then the pin $O^5$ engages and turns the pinion R, so as to shift the ring P in the inverse direction to that of the ring O, to bring the next following numerals of the ring P into view at the slot $A^{10}$. When the ring P has made one revolution, then the pin $P^4$ turns the pinion S to shift the ring Q, to bring the next numerals of the latter in view in the slot A¹⁰, it being understood that each of the rings O and P is provided with one hundred divisions and the ring Q is divided into eighty-six parts.

In order to set the rings back to zero, I first place a key on square end S² of the shaft S' and turn the latter to bring the ring Q to show 85 in the slot A¹⁰, and then the key is placed on the square end R² of the shaft R', and the latter is turned to revolve the ring P until the numerals 99 appear in the slot A¹⁰. The operator then sets one of the clutch mechanisms by shifting the pointer to any one figure at the graduation A⁸, after which the operator gently pulls the cable C² until the ring O reaches zero, whereby both rings P and Q are set to zero and held in this position by their spring pawls P⁵ and Q⁵.

If I desire to use the instrument without resetting to zero after a certain amount has been registered, I make use of a small slate, arranged on the front A⁹ of the casing A, on which slate I note the amount indicated in the slot A¹⁰ before I proceed to measure a new pile of lumber, and after this pile is measured I record on the slate the amount indicated in the slot A¹⁰, and subtract from this amount the former amount to learn the actual amount of the second pile of lumber measured. If the cable C² is strung or drawn over boards of irregular width, then the wheel C is revolved in the same proportion and the figures advanced will be likewise. Hence, the device is not only a registering one but it produces or calculates the figures in square feet of all areas over which the cable is extended, it being understood, however, that the device is gaged to the length of the lumber measure.

It will be seen that in this improved device the principal features of construction are the same as in my former application, but the improvements are such as to adapt the device to a more practical use. The casing is preferably made of metal covered with leather, and in order to prevent dust and other impurities from getting inside to the works contained in the casing, I prefer to close the slot A⁷ by a segment J⁴ attached to the outer end of the arm J², and engaging the inside of the rim of the casing A. See Fig. 2.

Having thus described my invention, I claim as new and desire to secure by Letters Patent—

1. In a measuring device, the combination of a rotative shaft, a series of independent registering mechanisms each provided with gearing and means whereby it may be thrown into and out of gear with the shaft, and a registering device connected with each of the several registering mechanisms, substantially as set forth.

2. In a measuring device, the combination of a rotative shaft having a series of gears, a series of independent registering mechanisms each comprising a shaft, a gear loose on the shaft and meshing with one of the gears on the rotative shaft, and a clutch mechanism for locking the gear and shaft of the registering mechanism together, and a single registering device geared to each of the shafts of the said registering mechanisms and adapted to register the total sum indicated thereon, substantially as set forth.

3. In a measuring device, the combination of a casing having a perforation in its wall, a series of concentric rings in the casing provided with series of numerals adapted to appear successively at the opening in the wall of the casing, means for driving the units ring, means for driving the remaining rings from the units ring, and roller bearings engaging the peripheries of and adapted to support said rings, substantially as set forth.

4. In a measuring device, the combination of a casing having a perforation in its wall, concentric circular series of rollers journaled in the casing, rings arranged between the series of rollers, and means for rotating said rings, substantially as set forth.

5. In a measuring device, the combination of a casing having a perforation in its wall, concentric circular series of grooved rollers journaled in the casing, rings held in the grooves of the said rollers and provided with series of numerals adapted to appear successively at the perforation in the wall of the casing, and means for rotating said rings, substantially as set forth.

6. In a measuring device, the combination of a casing, a rotative shaft therein, a units ring mounted on the shaft and adapted to rotate therewith, and a series of rings inside of and concentric with but rotative independently of the units ring, said rings being provided with pins projecting from adjacent faces and having series of numbers formed upon them, and pinions mounted on the casing between the respective rings whereby the same are driven, substantially as set forth.

7. The combination, in a measuring device, of a tubular shaft, a gear loose thereon having a projecting rim, semicircular shoes mounted on the shaft with their peripheries adapted to contact with the projecting rim of the gear, levers mounted on the shaft with their inner ends arranged in the hollow thereof, and their outer ends bearing on the said semi-circular shoes, and a pin in said tubular shaft having cam faces adapted to engage and move the said levers, substantially as set forth.

8. The combination in a measuring device, of a tubular shaft, a gear loose thereon having a projecting rim, semi-circular shoes mounted on the shaft with their peripheries adapted to contact with the projecting rim of the gear, levers mounted on the shaft with their inner ends arranged in the hollow thereof and their outer ends bearing on the said shoes, a pin having a headed end and provided with cam faces, said pin being movable longitudinally in the hollow of said shaft and having its cam faces arranged to engage the ends of the levers therein, whereby said levers are moved and a movable plate having a slot to receive the pin below the head thereof, and provided with a cam face adjacent to said slot adapted when the plate is moved to engage the head of the pin, substantially as set forth.

GEORGE KRUEGER.

Witnesses:
C. W. BJÖREKNER,
HENRY LILL.